United States Patent [19]

Rutherford

[11] 4,111,295

[45] Sep. 5, 1978

[54] HIGH SPEED METHOD OF AND APPARATUS FOR SIMILARLY ORIENTING ARTICLES

[75] Inventor: Arthur J. Rutherford, Maumee, Ohio

[73] Assignee: Owens-Illinois, Inc., Toledo, Ohio

[21] Appl. No.: 755,553

[22] Filed: Dec. 30, 1976

[51] Int. Cl.² .............................................. B65G 47/24
[52] U.S. Cl. ........................................ 198/399; 221/158
[58] Field of Search ............... 198/383, 388, 394, 396, 198/398, 399, 191, 192, 193; 221/157, 158, 159, 160, 161, 172, 173; 193/44

[56] References Cited

U.S. PATENT DOCUMENTS

| | | | |
|---|---|---|---|
| 2,379,564 | 7/1945 | Cole | 198/399 X |
| 3,265,185 | 8/1966 | Weselik | 198/398 X |
| 3,392,816 | 7/1968 | Cox | 198/392 X |
| 3,752,294 | 8/1973 | Harmon | 198/396 X |
| 3,759,418 | 9/1973 | Wilson et al. | 198/398 X |
| 3,782,526 | 1/1974 | Simons | 198/399 X |

FOREIGN PATENT DOCUMENTS 474,896   4/1929   Fed. Rep. of Germany ........... 221/157

*Primary Examiner*—Evon C. Blunk
*Assistant Examiner*—Douglas D. Watts
*Attorney, Agent, or Firm*—Alan J. Steger; Myron E. Click; David H. Wilson

[57] ABSTRACT

A method of sorting articles having major and minor surfaces such that they normally assume a position presenting one major surface against a support surface and an opposed major surface spaced from said support surface wherein the articles are aligned on a support surface and advanced in a guided single file past a discriminating means which alters the path of advance of those articles having a first given orientation of its major surface relative to the guide means. The articles of the opposite major surface orientation relative to the guide means support surface are thus segregated. Both segregated groups of articles can be merged following their orientation to a like major surface relationship to a reference support surface.

A turntable imposes centrifugal forces on the articles to be sorted to pass them to a tangential guide chute in single file. A discriminating chute system consisting of two discrete chutes in a Y relationship to the tangential chute respectively receive articles of like orientation segregated by a discriminator which act upon a portion of one given major surface of the article to divert it to one of the discriminating chutes. In the case of articles having narrow and wide edges on respective surfaces the discriminator is a pair of fingers intersecting and engaging the major surfaces of each article at the branch of the Y chute system to provide pivots on the surface portion around which the articles turn. Two such discriminating fingers arranged to engage opposite major faces of the articles turn those which are face up into one branch chute and those which face down into the other branch chute. Both branch chutes can be directed to an article accumulator which maintains the articles in the orientation they are received and can be turned to deliver all oriented articles in the same orientation.

5 Claims, 5 Drawing Figures

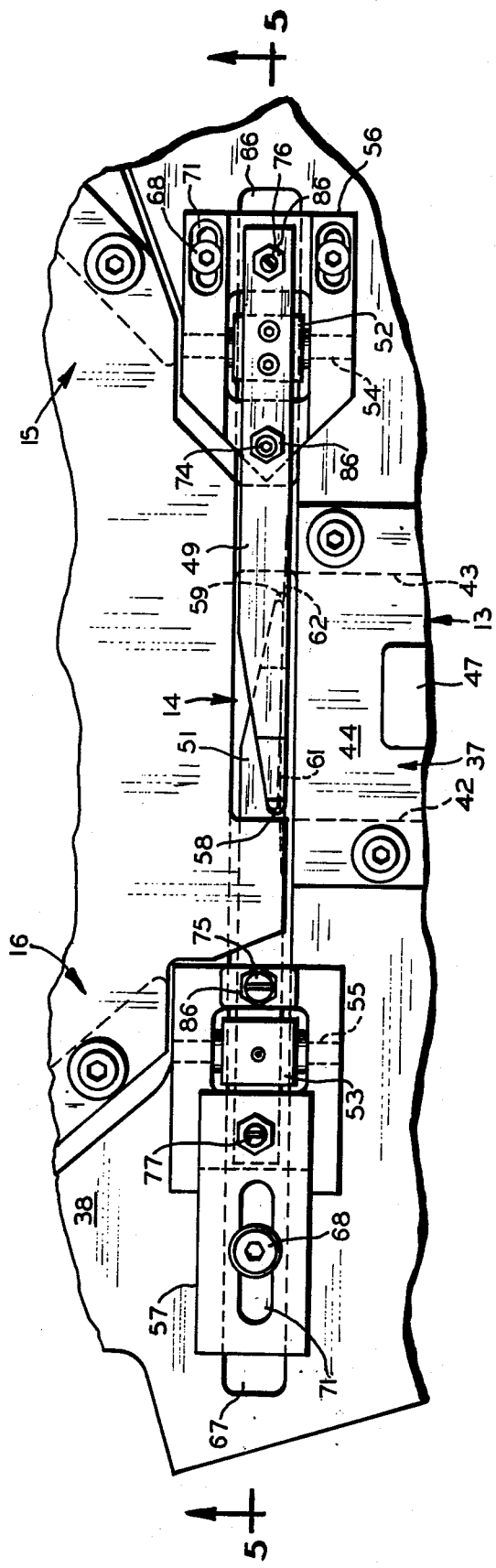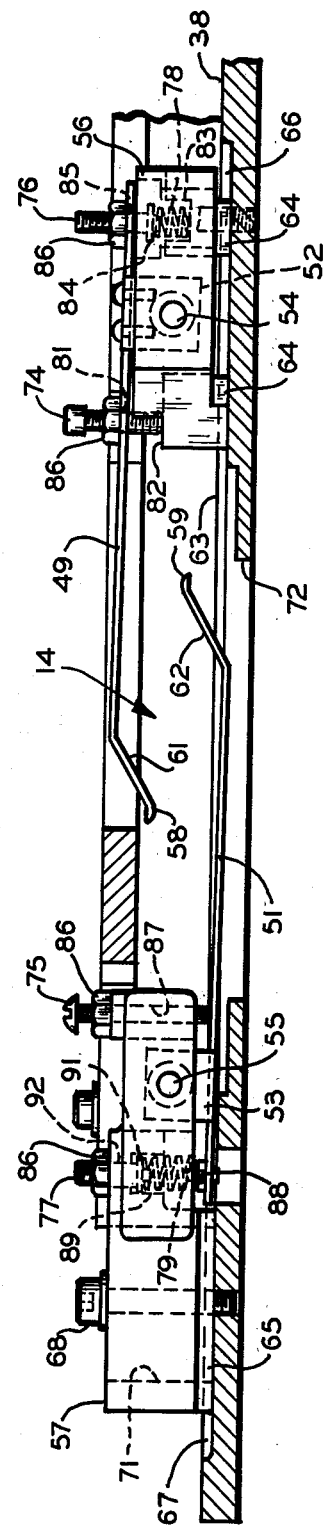
FIG. 4
FIG. 5

HIGH SPEED METHOD OF AND APPARATUS FOR SIMILARLY ORIENTING ARTICLES

BACKGROUND OF THE INVENTION

1. Field of the Invention

This invention relates to methods of and apparatus for sorting articles according to their orientation as received in a random orientation from a source. A particular aspect of this invention is applicable to closures for containers.

2. Description of the Prior Art

High speed sorting apparatus and techniques have been sought for many applications particularly those involving packaging. Typically they have involved utilizing the dimensional characteristics of the article to arrange them in an orderly manner so that they can be segregated in a common orientation. Donofrio U.S. Pat. No. 3,086,639 of Apr. 23, 1963 for "Method and Machine for Similarly Arranging Open-Topped Containers or the Like" in its specific disclosure sets forth a feed means for containers having external lips or flanges around their open tops to orient the containers in series with their tops randomly oriented in either of two opposed directions. These containers are then presented to a guide wherein guide elements engage the container flanges to segregate the containers in accordance with the orientation of their open tops so that all containers of like orientation are grouped together in respective guides and discharged from their respective guides in like open topped orientation. The Donofrio system, while effective, was applicable only to an article having outwardly extending flanges.

Other segregating means include apparatus for sorting closures having internal flanges wherein the closure segregating means were effective on but a first given orientation of closure and those of other orientations were returned to a feed path such as a bin. These closure sorting devices have been of such a type that as a line of closures encountered the sorting finger, ramp guides, pads, or what ever means was employed, the line of closures was sorted only for one orientation. Those closures which did not meet the orientation requirements were directed to a hopper or bin to again be placed in the sorting line. The devices had the drawbacks of rejecting about one-half of the closures on their first pass and to taking up time not only to allow the sorting means to physically displace the rejected closure from its path of travel but of taking up at least one additional machine cycle to repass the originally rejected closures again through the sorting means. This subjected the closure to repetitive handling and in some instances to damage, particularly where high speed operation is utilized. Also, some time and considerable expense were usually lost in recycling operations for those rejected closures.

One form of currently used closure sorting device operates at maximum flow rates of around 300 closure per minute.

Additionally, many current sorting devices are able to sort only one type of closure and either are difficult and costly to convert to other sizes and shapes or cannot be converted at all.

SUMMARY OF THE INVENTION

The instant invention contemplates a high speed article sorter composed of an alignment chute adapted to receive a single row of articles from a supply hopper and to feed the articles in a single line, in a single plane, to a discriminating means having a first and a second discriminating finger each of which selects one orientation of article, either first surface-proximate or first surface-remote from a reference surface. The discriminating fingers are located at opposed sides of the article feed path on opposed faces of that path and are biased toward path of the major surfaces of the articles and are arranged to lightly pass across a smooth surface, a wide flange on the top face in the case of circular home canning jar rings, and to pass over and engage the side of a protrusion, the inner side of a thin lip on the lower face in the case of the jar rings, to provide a pivot for turning the articles which is briefly effective during their travel along the path.

A first group of articles of a first orientation, are directed into a first discrimination chute which directs the articles to an exit which may communicate with an accumulator in which the articles are stored in a single orientation. A second group of articles of a second orientation are directed by the second discriminating finger into a second discriminating chute which delivers this second group to an exit which may also communicate with the accumulator in an orientation identical to those of the first group by inverting their path of travel prior to their entry into the merging chute.

Typical previous sorters have had maximum speeds to around 300 articles per minute. The present invention when sorting the same articles, is operable at rates in excess of 720 articles per minute, representing a substantial improvement in sorting speed without adverse effects on the articles.

This present method of sorting every article on its first pass through the sorter has overcome the previous necessity of recycling about one half of the articles at least one additional time.

The dual discrimination chute system feeding a single accumulator also aids in the increased efficiency of the present system by faciliating a rapid continuous article flow and by eliminating the necessity of multiple collection stations for differently oriented articles.

Together the unique discriminating finger system and the dual discriminating chute system form a system capable of sorting articles such as closures at rates faster than twice the previous rate of conventional closure sorters.

Further, the instant invention requires a minimum of human supervision to operate at high speeds for long periods of time, thereby providing substantial savings in man-hour costs.

An object of the present invention is to facilitate orientation of articles at high speeds.

A second object of the invention is to simplify and reduce the expense of operating closure sorting devices.

An additional object of the invention is to permit the sorting of every closure on the first pass through the sorting device.

BRIEF DESCRIPTION OF THE DRAWINGS

FIG. 4 is a plan view of the throat region of the discrimination device; and

FIG. 5 is an elevational view in cross section along the line 5—5 of FIGS. 2 and 4.

DESCRIPTION OF THE PREFERRED EMBODIMENT

Articles are similarly oriented according to the method of this invention by positioning all articles in one of two preferred positions determined by the article geometry, aligning the thus positioned articles to be passed serially through a discriminating step in which those articles of one preferred orientation are segregated in one path while those of the other preferred orientation are segregated in another path. The respective segregated articles are serially conveyed and serially turned to a common preferred orientation before being merged in that common orientation. The accumulated articles are passed to a further utilization station (not shown) such as a packaging or application station.

Figure 1:
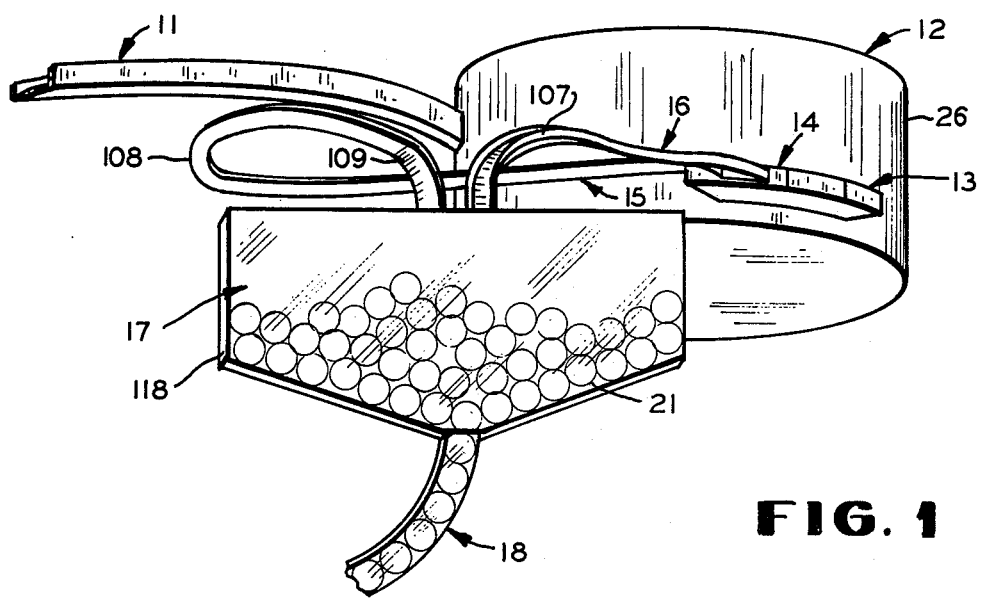
FIG. 1 is a simplified perspective view of an article sorting and orienting system according to the present invention with the support members therefor omitted for purposes of illustration.

FIG. 1 shows an overall schematic view of a system for orienting articles of like geometry wherein the articles are fed in random orientation along a feed conveyor 11 into a first orientation station 12 in which they are positioned according to their geometry in one of two preferred positions. In the exemplary system the articles to be oriented have generally parallel major plane dimensions spaced by a minor dimension so that the two preferred positions locate one of the major plane dimensions against a reference surface. The articles are propelled along the reference surface and guided in alignment through alignment guide 13 so they can be serially segregated at a discriminator unit 14 at the end of guide 13 as to segregate those with a first major dimension adjacent a reference surface from those with a second major dimension remote from that surface. The segregated articles are serially passed along guides 15 and 16 which turn them to a common orientation and merge the flow of the articles as in accumulator 17. From accumulator 17 the articles can be passed to a further processing station (not shown) through suitable conveying means shown as delivery guide 18.

Articles are segregated in accordance with the orientation of their dimensions by advancing them along a reference surface against which one or the other of their major dimensions is maintained and, selectively according to which major dimensions is against the surface, changing the velocity of one side of the articles to cause them to turn from their path of advance. A retardation of one side of the articles having a first major dimension adjacent the reference surface will cause those articles to be deflected around that one side. Those articles having a second major dimension adjacent the reference surface can be permitted to continue along their path of travel or be deflected toward the opposite side of said path by a change of velocity on a side, either an increase on the one side or a retardation on the opposite side from the one side. Thus articles with unique geometries on or adjacent their first and second major dimensions can be operated upon by a retarding means effective on a body portion unique to and adjacent or in a first major dimension adjacent a first side of their travel path when that first major dimension is adjacent the reference surface to be pivoted around the retarding means to a first deflected path and by a similar second retarding means adjacent a second side of their travel path when that first major dimension is remote from the reference surface to be pivoted around the second retarding surface to a second deflected path. The articles are thus divided into branched paths, typically of the form of a Y, according to their orientation with respect to the reference surface.

One particularly advantageous utilization of the concept of changing velocity of the article at one side of the path of advance of the article is to retard articles from opposite sides and opposite faces of their serial path at a common cross section of that path whereby all articles traveling that path are redirected to either of two paths from essentailly the same point in the primary supply path.

In the discussion of the specific apparatus illustrative of this invention the articles to be segregated will be closures of metal or plastic, more particularly home canning jar cap rings 21 of generally right circular cylindrical form wherein the first and second major dimensions are the circular faces at the ends of the cylinder. The face adapted to receive the mouth of the canning jar is defined by an open center surrounded by a relatively narrow lip 22. The opposite face or top of the cap ring is generally circular and has an inwardly extending flange 23. The minor dimension of the cap ring 21 is the height of the cylindrical side wall 24. It is to be understood that other articles can be oriented according to the method of this invention in the apparatus illustrated. For example, jar closures having a top which is continuous within the circular periphery and/or which have flared sides.

Conveyor 11 can be a bucket chain which picks up closures randomly oriented in a bin (not shown) and dumps them in that manner into the first orientation station 12. Station 12 comprises a drum 26 containing a rotatable turntable 27 in its bottom such that its rotation distributes the closures with their faces having the inwardly projecting flanges 23 uppermost or their faces having the rolled lip 22 uppermost and subjects them to centrifugal force such that they accumulate against the inner wall 28 of drum 12. Alternatively, the first orientation station can be in the form of a horizontal or inclined vibrating panel having closure impelling means such as air jets or can be vertically mounted on a magnatized disc rotating about a horizontal central axis. First orientation station 12 is supported on a suitable base (not shown) which may be elevated to accomodate the equipment in the down stream path of the closures issuing therefrom. A base plate 30 is provided for mounting the closure alignment means and discrimination means on the apparatus base.

A turntable discharge chute 29 extends tangentially from the inner wall 28 of drum 26 to align the primary oriented closures in serial form and convey them to the discriminator unit. Chute 29 has a bottom plate 31 secured upon face plate 30 the upper surface of which is flush with the turntable closure support surface 27. Outer side rail 32 of chute 29 is tangential to the wall 28. An inner side rail 33 of chute 29 is parallel to outer side rail 32 and extends through an aperture 34 in wall 28 and over the periphery of turntable 27 to a point spaced about a diameter of closure 21 radially inward of the turntable periphery to define the width of chute 29 as slightly greater than a closure diameter. A cover 35 is secured to side rails 32 and 33 as by machine screws 36. Cover 35 extends through aperture 34 and over that portion of chute 29 within drum walls 28 and is spaced above bottom 31 slightly in excess of the height of the closure cylinderical side walls 24 to define an entry to chute 29 which will accomodate only a single layer of closures having their major faces against turntable 27.

Downstream of turntable discharge chute 29 is an intermediate chute 37 which communicates with the discriminator unit 14. Bottom plate 38 for chute 37 is secured to base plate 30 by toggle clamps 39 and is aligned with discharge chute 29 and discriminating chute 41 by indexing pins (not shown) between base plate 30 and bottom plate 38. Chute 29 has side rails 42 and 43 aligned with side rails 32 and 33 and a cover 44 secured thereto by screws 45. Chutes 29 and 37 are of the same cross section to accomodate a single row of closures and convey them to the discriminator 14.

The centrifugal force impelling the closures from the rotating turntable 27 into and along the discharge chute 29 and intermediate chute 37 is augmented by a gas jet, preferably air, directed from nozzle 46 through port 47 in the cover 44. The air jet is directed along the path of travel of the articles and in their travel direction at the center of the chute to impart additional drive along the straight axis of aligned chutes 29 and 37. Air is supplied from a suitable source (not shown) through hose 48 and is controlled to be applied while required, as by coupling it to be turned on with the turn on of the drive of the turnable (by means not shown).

Spring fingers 49 and 51 mounted on pivot blocks 52 and 53 having pivot pins 54 and 55 journaled in finger pivot brackets 56 and 57 are located at the exit end of the intermediate chute 37 to provide the selective retarding means for the closures. These fingers are each provided with a rounded end 58 and 59 and are chamfered on their side and face 61 and 62 adjacent the intermediate chute 37 and closures 21 issuing therefrom so that they ride over the leading edge of the closures 21 as they issue from the chute when ends 58 and 59 are extended into the path from reference surface 63 on bottom plate 38 in the case of finger 51 and toward reference surface 63 in the case of finger 49. Thus, chamfer 61 or 62 and end 58 or 59 ride onto the flange 23 of those closures having the flange 23 adjacent their ends 58 or 59 and slide across those flanges to drop free of the closure without significantly retarding its passage. Those closures having the lip 22 adjacent the fingers are retarded since the finger ends 58 or 59 are cammed over the lip and drop into the open region within the major dimension surrounded by the lip to engage briefly the inner wall of the cylindrical side walls 24 of closure 21. The transverse position of the finger end 58 and 59 must, therefore, be positioned to coinside with the region traversed by the flange 23 and to be within the region bounded by the lip 22 in order to selectively retard and turn those closures presenting the lip 22 to their end 58 or 59 while passing without significant retardation those closures presenting the flange 23 to their end 58 or 59. Advantageously the ends 58 and 59 are in a common cross sectional region of the chute.

Pivot brackets 56 and 57 are mounted on bottom plate 38 to afford transverse adjustment of finger ends 58 and 59 by transverse slides in the form of splines 64 and 65 fitting into grooves 66 and 67 in bottom plate and are fixed in their transverse adjustment by tightening clamps, against the upper face of brackets 56 and 57 such as machine screws 68 extending into bottom plate 38 through elongate slots 71 in brackets 56 and 57.

A groove 72 is milled through bottom plate 38 to accomodate finger 51 and its pivot block 53 for transverse to the closure path, depth of end 59 in the closure path, and pivotal motion of the spring finger 51. Spring finger depth extension into the path of the closures defined by bottom plate 38 and cover 44 of intermediate chute 37 is adjustable by means of adjustment screws 74 and 75 intermediate the pivot pins 54 and 55 and the finger ends 58 and 59 while spring pressure can be adjusted by adjustment screws 76 and 77 operating on compression coil springs 78 and 79 biasing the spring fingers on the outboard ends of the spring fingers. Thus finger 49 is pivoted toward reference surface 63 by driving screw 74 into a tapped hole 81 in spring finger 49 so that screw 74 is backed away from an abutment 82 on bracket 56. Spring finger 49 is pivoted away from surface 63 by screwing screw 74 out of the tapped hole 81. Spring pressure opposes the stop provided by the screw 74 by biasing the hidden face of finger 49 to the left of pin 54 in FIG. 5 away from surface 63 and the finger end 58 toward reference surface 63. Spring 78 is maintained in compression with its end adjacent surface 63 seated in a cavity 83 in pivot bracket 56. Its force is adjusted by screw 76 which has a flanged stud on its inner end to provide an inner seat 84 for spring 78 and is in threaded engagement with a tapped hole 85 in spring finger 49. Each adjustment screw has a lock nut 86. A similar adjustment arrangement for spring finger 51 is provided to operate around pivot pin 55. Height adjustment screw 75 is tapped in a bore 87 in bracket 57 and abuts spring finger 51. Coiled bias spring 79 is fitted over and retained by stud 88 extending from spring finger 51 to abut spring finger 51 at its lower end in FIG. 5. Spring 79 lies within cavity 89 in bracket 57 and is fitted over the flanged end 91 of screw 77 fitted in tapped bore 92 in the bottom of cavity 89.

As closure 21 advance along the path defined by chute 37 they encounter finger ends 58 and 59. If the closure 21 is mouth up, lip 22 upward, finger end 59 is cammed across flange 23 with no significant effect while finger end 58 passes over lip 22 and drops into the open mouth of the closure thereby momentarily retarding the left side of the closure as it advances into the paper as viewed in FIG. 5. This causes mouth up closure 21 to pivot around end 58 and be directed into guide 16. Conversely a mouth down closure 21 at the cross section region of chute 37 including fingers 49 and 51 will be retarded by end 59 while end 58 has little effect and will be pivoted into guide 15.

Figure 3:
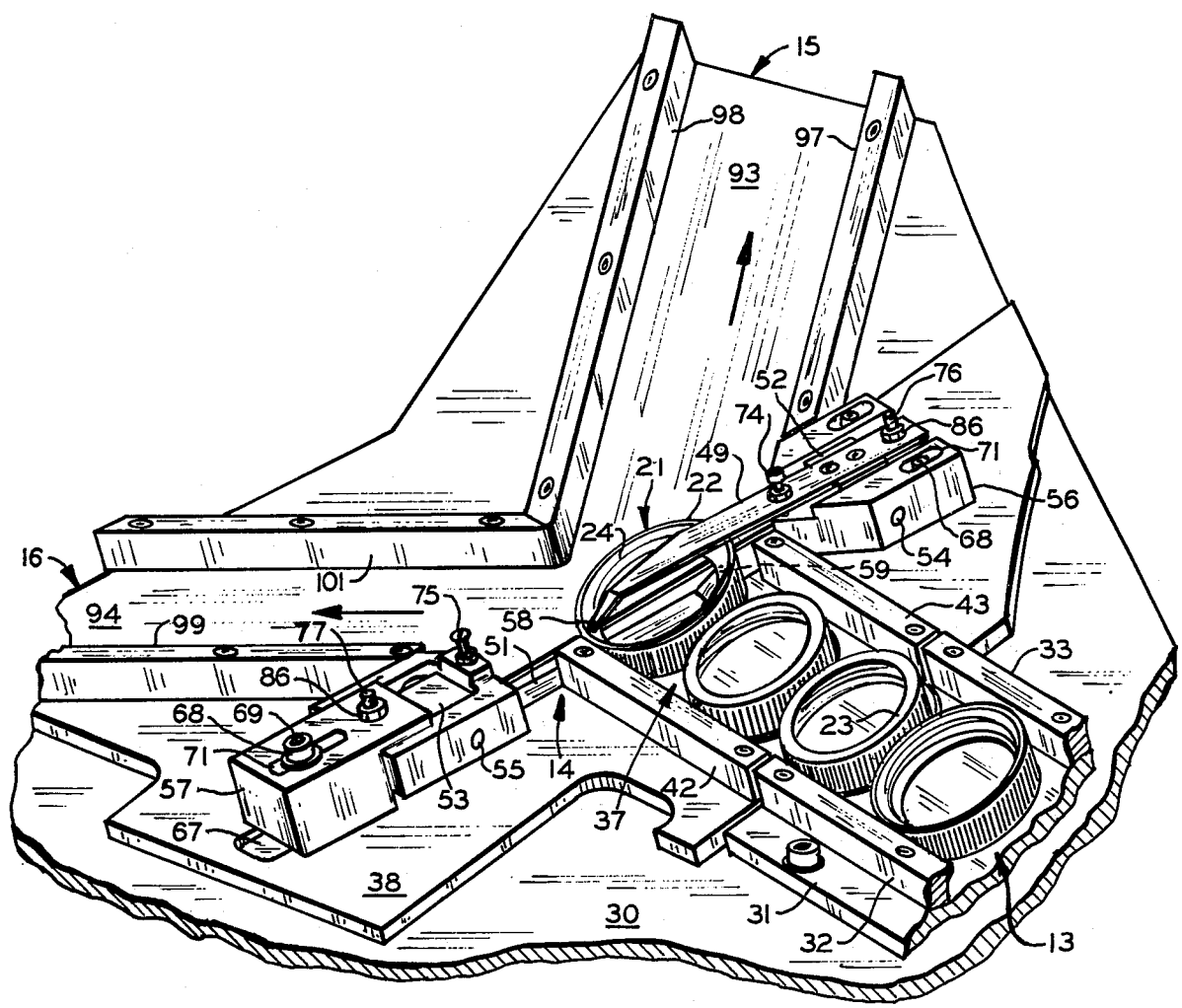
FIG. 3 is a fragmentary perspective view of the sorting discrimination device of FIG. 2 with the cover plates removed.
Figure 2:
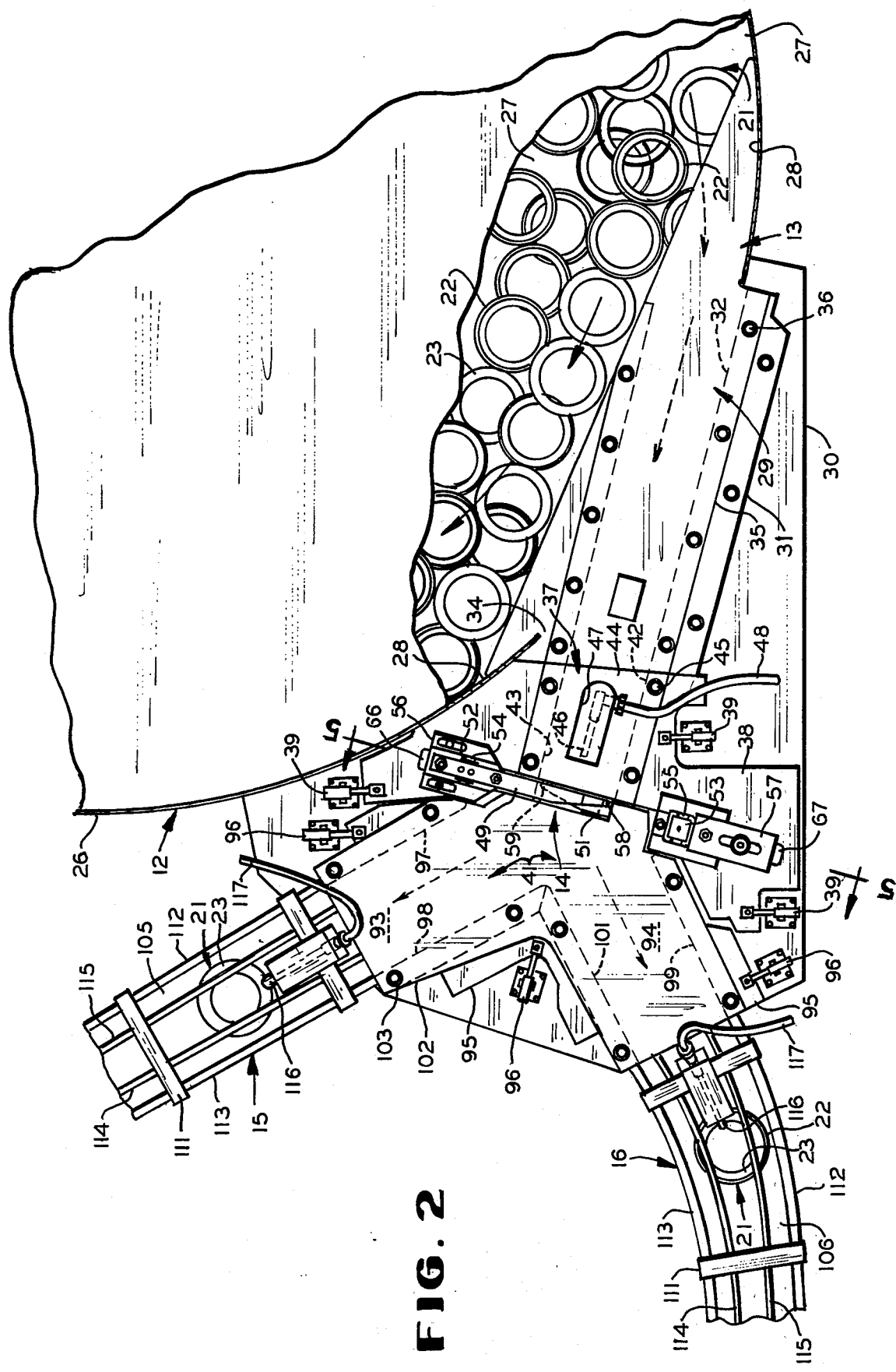
FIG. 2 is a fragmentary plan view of a horizontal rotating turntable and sorting device included in the system of FIG. 1.

Thus, the closures retarded at the sides adjacent the branches into which the discriminator is divided are turned into those branches as by finger end 58 turning those closures with lips 22 upward as viewed in FIGS. 2 and 3 into the left branch 16 while those closures with lips 22 downward are turned into right branch 15. These branches or discriminator chutes 93 and 94 are made up of bottom plate 95 secured by toggle clamps 96 to mounting plate 30 and indexed thereto by indexing pins (not shown). Side rails 97 and 98 for chute 93 define a receiving mouth of greater width than the maximum diameter of the closures adjacent the discriminating fingers and narrowing to approximately the closure maximum diameter downstream therefrom. Similar side rails 99 and 101 are provided for chute 94. The branched discriminator chutes 93 and 94 are covered by a cover plate 102 which is secured to the side rails by screws 103. The chute height between the inner faces of plates 95 and 103 is slightly in excess of the height of the closure side walls 24.

Delivery chutes 105 and 106 carry the closures in single file to accumulator 17 and turn the closures to a common orientation before they are merged in the accumulator. While the chutes 105 and/or 106 could be twisted along their lengths to turn the closures out of the plane in which they were segregated, it has been found advantageous to maintain the closure orientation in that plane generally paralleling the reference surface 63 until they are turned out of the plane and into a common plane of the accumulator 17. As viewed in FIG. 1 closures 21 with their lips 22 uppermost are segregated and passed through chutes 94 and 106, the latter of which is turned from the horizontal to the generally vertical orientation of the accumulator 17 through a turn 107 of approximately 90° downward to deliver the closures with their lips 22 facing the viewer in a single layer of one closure thickness in the accumulator. Those closures with their lips 22 downward are passed through chutes 93 and 105, the latter of which carries them through a 180° bend 108 in the horizontal so they are carried beyond the accumulator and carried back toward the accumulator from the viewer before being carried through a 90° turn 109 to the vertical for delivery to the accumulator with their lips also facing the viewer.

Delivery chutes 105 and 106 are made up of open frames comprising periodically spaced cross bars 111 secured to side rails 112 and 113 spaced slightly greater than the diameter of the closures and supporting paired top and bottom rails 114 and 115 spaced slightly greater than the height of the closure side walls. Where appropriate, along the length of chutes 105 and 106 air nozzles 116 are provided to drive the closures toward the accumulator 17. These nozzles are supplied and controlled, as in the case of nozzle 46, through air hoses 117.

Accumulator 17 is made up of a hopper having two planar surfaces spaced slightly greater than the height of the closure side walls 118 to maintain the closures in a single layer. An outlet chute or delivery guide 18 is located at the apex of the hopper bottom 118 so that the closures flow by gravity to the utilization device (not shown) with each closure in the merged flow, as viewed in FIG. 1, having its lip 22 facing the viewer Thus the closures are all delivered with a common orientation to a packaging or application station.

It is to be understood that this invention lends itself to modifications of the means for changing the velocity of one side of an article relative to the opposite side of that article to shift its path of advance laterally. In addition the unique surface configuration upon which the velocity changing means is effective might be other than the inner wall surface of the mouth of the caps, as a drag magnet effective on the broad surface of the flange 23. It has been shown to be advantageous to divert the path of advance of each closure maintained in the reference plane through the discriminator at a given cross section of that path by locating finger ends 58 and 59 in the same cross secion, thereby developing a Y-shaped flow of closures. However, the displacement stations for discrimination of the closures subject to the first step of orientation might be spaced along the path of advance in the reference plane and might even be directed to the same side of the path rather than opposite sides. Variations in the form of the guides is comtemplated as within the invention concept. Accordingly it is to be recognized that the preceeding disclosure is to be read as illustrative and not in a restrictive sense.

What is claimed is:

1. Apparatus for separating a first group of open-mouthed articles having a top plane portion, a skirt portion connected to the outer periphery of the top panel portion and an open mouth opposite said top panel portion, and having a first orientation from a second group of open-mouthed articles identical to the first group of open-mouthed articles but having a second orientation, inverting said second group of open-mouthed articles from said second orientation to said first orientation and re-combining said second group of open-mouthed articles having said first orientation, said apparatus comprising, in combination, means for receiving said open-mouthed articles of said first and second orientations in serial alignment on a reference surface and for maintaining the orientation of said articles relative to said reference surface, first finger means adjacent to said reference surface and adapted to engage said first group of open-mouthed articles having a first orientation and to deflect said first group of open-mouthed articles along a first deflected path, a second finger means overlying said first finger means and said reference surface and adapted to engage said second group of open-mouthed articles having a second orientation and deflect said second group of open-mouthed articles along a second deflected path, means within said second deflected path to invert said second group of open-mouthed articles from said first orientation to said second orientation, means for moving said first and second groups of open-mouthed articles along said first and second deflected paths, and an accumulator means for receiving said first and second groups of open-mouthed articles from said first and second deflected paths to re-combine said first and second groups of open-mouthed articles, all of the re-combined open-mouthed articles having said first orientation.

2. Apparatus as set forth in claim 1 wherein said first group of open-mouthed articles of said first orientation each have their open mouth adjacent said reference surface.

3. Apparatus as set forth in claim 2 wherein said second group of open-mouthed articles each have their top panel portion adjacent said reference surface.

4. Apparatus as set forth in claim 3 wherein said first finger means engages the interior of the skirt portion of said first group of open-mouthed articles through the open mouth thereof to deflect said first group of open-mouthed articles along said first deflected path while said second finger means slides over the top panel portion of said first group of open-mouthed articles.

5. Apparatus as set forth in claim 4 wherein said second finger means engages the interior of the skirt portion of said second group of open-mouthed articles through the open mouth thereof to deflect said second group of open-mouthed articles along said second deflected path while said first finger means slides over the top panel portion of said second group of open-mouthed articles.

* * * * *

UNITED STATES PATENT AND TRADEMARK OFFICE
CERTIFICATE OF CORRECTION

PATENT NO. : 4,111,295
DATED : September 5, 1978
INVENTOR(S) : Arthur J. Rutherford It is certified that error appears in the above-identified patent and that said Letters Patent are hereby corrected as shown below:

Col. 1, line 58 "closure" should be -- closures --

Col. 6, line 17 "screwing" should be -- rotating --

Col. 8, line 8 "plane" should be -- panel --

Signed and Sealed this

Eighth Day of May 1979

[SEAL]

Attest:

RUTH C. MASON
Attesting Officer

DONALD W. BANNER
Commissioner of Patents and Trademarks